UNITED STATES PATENT OFFICE.

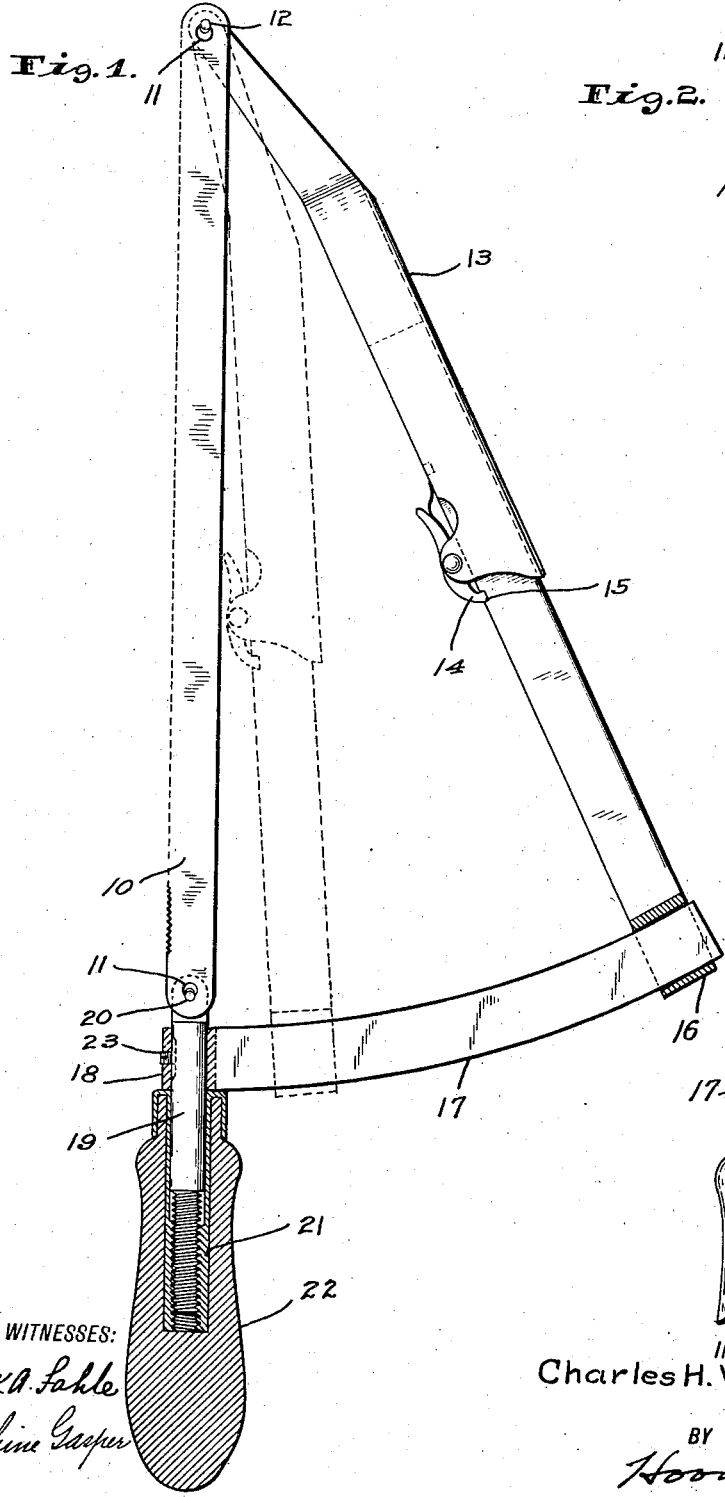
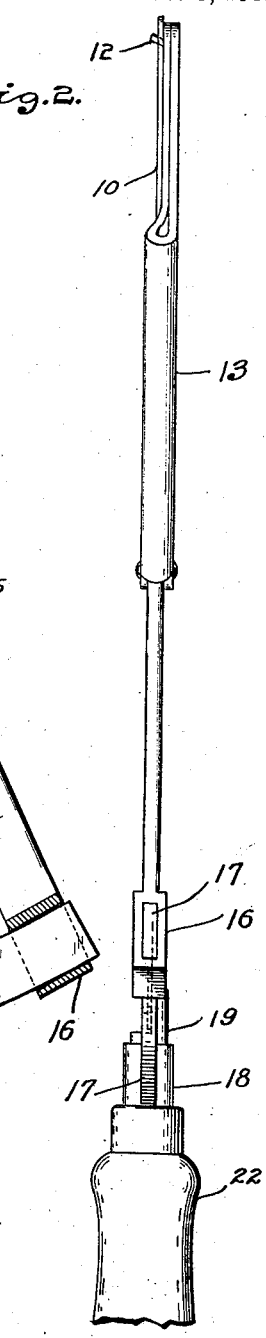

CHARLES H. WILLIAMS, OF INDIANAPOLIS, INDIANA, ASSIGNOR TO E. C. ATKINS & CO., OF INDIANAPOLIS, INDIANA, A CORPORATION OF INDIANA.

HACKSAW-FRAME.

1,245,545.                Specification of Letters Patent.         Patented Nov. 6, 1917.

Application filed October 16, 1916. Serial No. 125,764.

*To all whom it may concern:*

Be it known that I, CHARLES H. WILLIAMS, a citizen of the United States, residing at Indianapolis, in the county of Marion and State of Indiana, have invented a new and useful Hacksaw-Frame, of which the following is a specification.

It is the object of my invention to provide a hack saw which can readily be used in restricted places, as for instance by an electrician when working in narrow spaces within walls or under floors, and which is adjustable for hack saw blades of different lengths.

The accompanying drawing illustrates my invention. Figure 1 is a side elevation of a hack saw embodying my invention, with the tightening handle in section; and Fig. 2 is a back elevation of said hack saw.

The hack saw blade 10 is of the standard construction, with holes 11 at its ends. The hole 11 at the forward end of the blade 10 hooks over a pin 12 on an arm 13, which is preferably made of two telescoping parts which may be latched together in any relative position by a spring latch 14 mounted on one of said parts and taking into any of a plurality of notches 15 in the other of such parts. The rear end of the arm 13 is provided with a socket 16 which fits slidingly over an arc-shaped bar 17 which in turn is provided with a socket 18 through which projects a bolt 19 provided at one end with a pin 20 for projecting through the hole 11 at the rear end of the hack saw blade 10 and threaded at the other to coöperate with an internally threaded socket 21 fixed within the handle 22. The arc-shaped bar 17 is prevented from turning relatively to the bolt 19, and held in the plane of the saw blade 10, in any suitable manner, as by a screw 23 mounted in the socket 18 and projecting into a keyway in the bolt 19. The curvature of the arc-shaped bar 17 is approximately with the pin 12 as a center, so that the socket 16 can slide along such arc-shaped bar as the rod 13 is turned about the pin 12 as a center; but this is sometimes only approximate, because of the possibility of change in length of the bar 13, but because the socket 16 is made slightly loose such sliding can nevertheless occur.

By this construction, the rod 13, the saw blade 10, and the arc-shaped bar 17 are in the general form of a triangle. When there is plenty of room for sawing, the socket 16 is swung out to the end of the arc-shaped bar 17, as shown in full lines, as this produces the most rigid structure. However, when the space is restricted, the rod 13 is swung to the dotted line position, thus bringing the socket 16 close to the bolt 19, and thereby diminishing the angle of the triangle at the front end of the saw blade 10 and providing an exceedingly narrow framework. In either position of the rod 13, the socket 16 may be cramped on the arc-shaped bar 17 by screwing up the handle 22, thus pushing the socket 18 along the bolt 19 toward the saw blade 10 to tighten such saw blade and bind the bar 17 in the socket 16. This binding is sufficient to prevent slipping until the handle 22 is unscrewed.

I claim as my invention:

1. A hack saw frame, comprising an extensible rod arranged for pivotal connection to the forward end of the hack saw blade, a member arranged for connection to the rear end of the hack saw blade, and a bar mounted on said member and projecting therefrom in the plane of and behind the saw, said rod having a slidable mounting on said bar, and said bar being movable on said member lengthwise of the saw to cramp the rod and bar.

2. A hack saw frame, comprising a rod arranged for pivotal connection to the forward end of the hack saw blade, a member arranged for connection to the rear end of the hack saw blade, and a bar mounted on said member and projecting therefrom in the plane of and behind the saw, said rod having a slidable mounting on said bar, and said bar being movable on said member lengthwise of the saw to cramp the rod and bar.

3. A hack saw frame, comprising a rod arranged for pivotal connection to the forward end of the hack saw blade, a member arranged for connection to the rear end of the hack saw blade, and a bar mounted on said member and projecting therefrom in the plane of and behind the saw, said rod having a slidable mounting on said bar, and said bar being movable on said member lengthwise of the saw to cramp the rod and bar, said bar being in the form of an arc with its center approximately at the point of pivotal connection between the hack saw blade and the rod.

4. A hack saw frame, comprising a rod arranged for pivotal connection to the forward end of the hack saw blade, a bolt arranged for connection to the rear end of the hack saw blade, a bar slidably mounted on said bolt and projecting therefrom in the plane of and behind the saw, said rod having a slidable mounting on said bar, and a handle having a screw mounting on said bolt for forcing one end of said bar lengthwise of the bolt to tighten the saw blade and cramp the rod and bar where they engage.

5. A hack saw frame, comprising a rod arranged for pivotal connection to the forward end of the hack saw blade, a bolt arranged for connection to the rear end of the hack saw blade, a bar slidably mounted on said bolt and projecting therefrom in the plane of and behind the saw, said rod having a slidable mounting on said bar, and a handle having a screw mounting on said bolt for forcing one end of said bar lengthwise of the bolt to tighten the saw blade and cramp the rod and bar where they engage, said bar being in the form of an arc with its center approximately at the point of pivotal connection between the hack saw blade and the rod.

6. A hack saw frame, comprising a rod arranged for pivotal connection to the forward end of the hack saw blade, a member arranged for connection to the rear end of the hack saw blade, and a bar mounted on said member and projecting therefrom in the plane of and behind the saw, said rod and said bar being adjustably interconnected so that with the hack saw blade they form an approximately triangular figure with a variable angle between the hack saw blade and the rod, and with the saw in operative condition for these different angles, and said bar being movable on said member lengthwise of the saw blade to tighten the latter for different adjustments of said rod and bar.

In witness whereof, I have hereunto set my hand at Indianapolis, Indiana, this 12th day of October, A. D. one thousand nine hundred and sixteen.

CHARLES H. WILLIAMS.

Copies of this patent may be obtained for five cents each, by addressing the "Commissioner of Patents, Washington, D. C."